(12) United States Patent
Singh et al.

(10) Patent No.: US 11,848,948 B2
(45) Date of Patent: Dec. 19, 2023

(54) CORRELATION-BASED SECURITY THREAT ANALYSIS

(71) Applicant: VMware, Inc., Palo Alto, CA (US)

(72) Inventors: Baibhav Singh, Sunnyvale, CA (US); Jayant Jain, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 397 days.

(21) Appl. No.: 17/126,045

(22) Filed: Dec. 18, 2020

(65) Prior Publication Data
US 2022/0201022 A1 Jun. 23, 2022

(51) Int. Cl.
*H04L 9/40* (2022.01)
*G06F 9/455* (2018.01)

(52) U.S. Cl.
CPC ...... *H04L 63/1425* (2013.01); *G06F 9/45558* (2013.01); *H04L 63/1416* (2013.01); *G06F 2009/45587* (2013.01); *G06F 2009/45595* (2013.01)

(58) Field of Classification Search
USPC .......................................................... 726/23
See application file for complete search history.

(56) References Cited

U.S. PATENT DOCUMENTS

| | | | |
|---|---|---|---|
| 9,223,962 B1 * | 12/2015 | Kashyap | G06F 21/52 |
| 10,270,668 B1 * | 4/2019 | Thompson | H04L 41/16 |
| 2016/0173509 A1 * | 6/2016 | Ray | H04L 63/1425 726/23 |
| 2017/0063897 A1 * | 3/2017 | Muddu | G06F 16/444 |
| 2018/0219888 A1 * | 8/2018 | Apostolopoulos | H04L 63/1425 |
| 2020/0344251 A1 * | 10/2020 | Jeyakumar | G06F 16/951 |
| 2021/0029002 A1 * | 1/2021 | Mordani | H04L 43/022 |

* cited by examiner

Primary Examiner — Sakinah White Taylor
(74) Attorney, Agent, or Firm — SU IP CONSULTING

(57) ABSTRACT

Example methods and systems for correlation-based security threat analysis are described. In one example, a computer system may obtain event information that is generated by monitoring a virtualized computing instance supported by a host; and network alert information that is generated by monitoring network traffic associated with the virtualized computing instance. The network alert information may specify security threat signature(s) detected based on the network traffic. The computer system may map the network alert information to threat information that specifies indicator(s) of compromise associated with the signature(s) and perform a correlation analysis based on the event information, network alert information and threat information. Based on the correlation analysis, it is determined whether there is a potential security threat associated with the virtualized computing instance.

18 Claims, 6 Drawing Sheets

US 11,848,948 B2

CORRELATION-BASED SECURITY THREAT ANALYSIS

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, it is desirable to detect potential security threats that may affect the performance of hosts and VMs in the SDDC.

DETAILED DESCRIPTION

Figure 1:
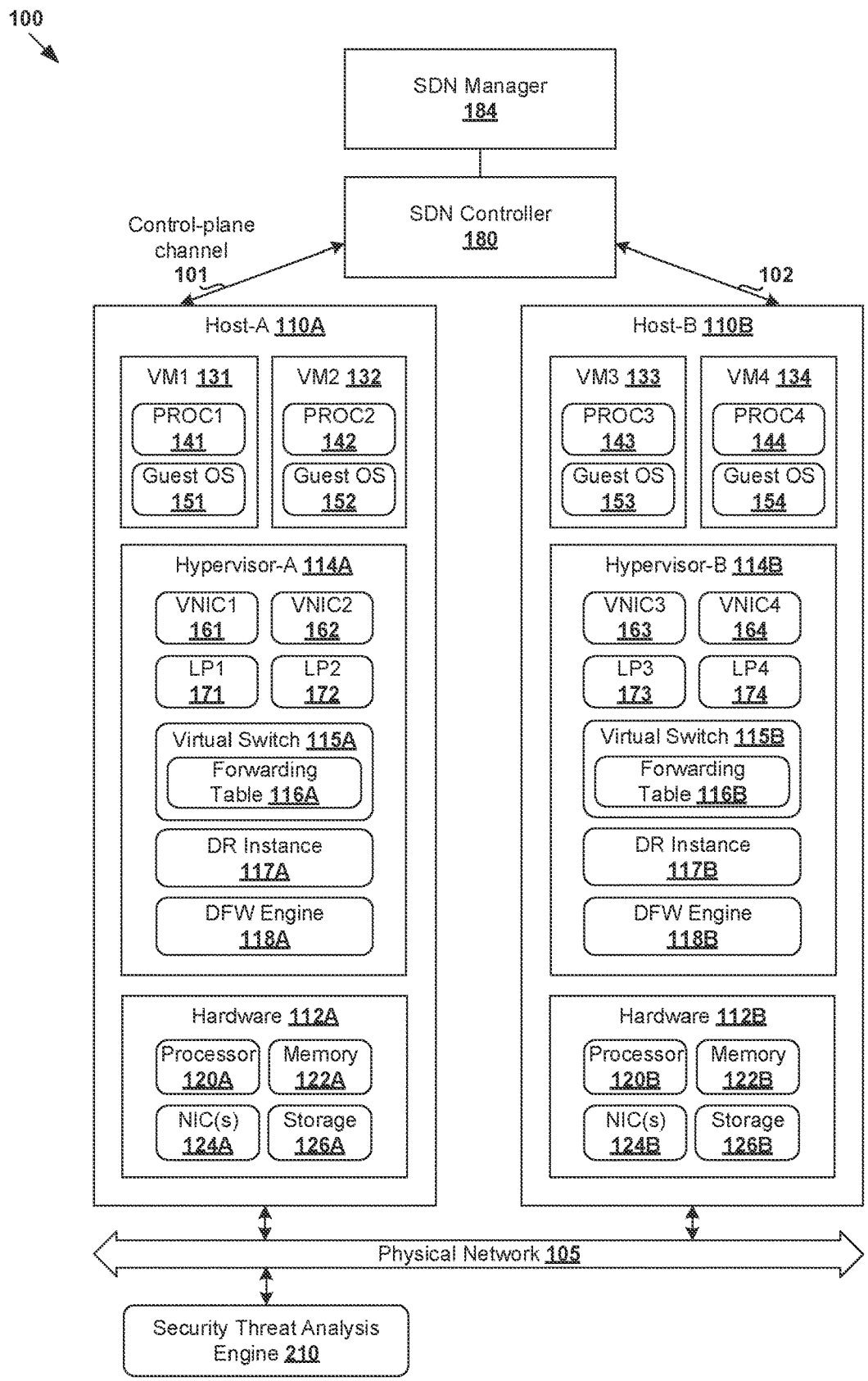
FIG. 1 is a schematic diagram illustrating an example software-defined networking (SDN) environment in which correlation-based security threat analysis may be performed.

According to examples of the present disclosure, a correlation-based security threat analysis may be implemented to improve data center security. In particular, a correlation analysis may be performed based on event information (denoted as X) that is generated by monitoring endpoints (e.g., virtual machines (VMs)), network alert information (Y) that is generated by monitoring network traffic associated with the endpoints and threat information (T) associated with the network alert information. In practice, the event information (X) may provide a deeper visibility at a VM level. The network alert information (Y) and associated threat information (T) may provide a wider visibility at a network level. By correlating information (X, Y, T) from different levels of granularity, examples of the present disclosure may facilitate a more detailed forensic analysis to improve security threat detection.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

FIG. 1 is a schematic diagram illustrating example software-defined networking (SDN) environment 100 in which correlation-based security threat analysis may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-B that are inter-connected via physical network 105. Each host 110A/110B may include suitable hardware 112A/112B and virtualization software (e.g., hypervisor-A 114A, hypervisor-B 114B) to support various VMs. For example, hosts 110A-B may support respective VMs 131-134. Hardware 112A/112B includes suitable physical components, such as central processing unit(s) (CPU(s)) or processor(s) 120A/120B; memory 122A/122B; physical network interface controllers (NICs) 124A/124B; and storage disk(s) 126A/126B, etc. In practice, SDN environment 100 may include any number of hosts (also known as a "host computers", "host devices", "physical servers", "server systems", "transport nodes," etc.), where each host may be supporting tens or hundreds of virtual machines (VMs).

Hypervisor 114A/114B maintains a mapping between underlying hardware 112A/112B and virtual resources allocated to respective VMs. Virtual resources are allocated to respective VMs 131-134 to support a guest operating system and application(s); see 141-144, 151-154. Any suitable applications 141-144 may be implemented, such as user-space and/or kernel-space processes labelled "PROC1" to "PROC4." For example, virtual resources may include virtual CPU, guest physical memory, virtual disk, virtual network interface controller (VNIC), etc. Hardware resources may be emulated using virtual machine monitors (VMMs). For example, VNICs 161-164 are virtual network adapters for respective VMs 131-134. Each VNIC may be emulated by a corresponding VMM (not shown) instantiated by hypervisor 114A/114B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 171-174 are associated with respective VMs 131-134. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM3 133 on host-B 110B may be connected to the same logical switch and located on the same logical layer-2 segment, such as a segment with virtual network identifier (VNI)=6000.

SDN controller 180 and SDN manager 184 are example network management entities in SDN environment 100. One example of an SDN controller is the NSX controller component of VMware NSX® (available from VMware, Inc.) that operates on a central control plane. SDN controller 180 may be a member of a controller cluster (not shown for simplicity) that is configurable using SDN manager 184 operating on a management plane. Network management entity 180/184 may be implemented using physical machine(s), VM(s), or both. Logical switches, logical routers, and logical overlay networks may be configured using SDN controller 180, SDN manager 184, etc. To send or receive control information, a local control plane (LCP) agent (not shown) on host 110A/110B may interact with central control plane (CCP) module 182 at SDN controller 180 via control-plane channel 101/102.

Hosts 110A-B may also maintain data-plane connectivity with each other via physical network 105 to facilitate communication among VMs 131-134. Hypervisor 114A/114B may implement a virtual tunnel endpoint (VTEP) (not shown) to encapsulate and decapsulate packets with an outer header (also known as a tunnel header) identifying the relevant logical overlay network (e.g., VNI). For example in FIG. 1, hypervisor-A 114A implements a first VTEP associated with (IP address=IP-A, VTEP label=VTEP-A). Hypervisor-B 114B implements a second VTEP with (IP-B, VTEP-B). Encapsulated packets may be sent via an end-to-end, bi-directional communication path (known as a tunnel) between a pair of VTEPs over physical network 105.

One of the challenges in SDN environment 100 is improving the overall data center security. To protect VMs 131-134 against security threats caused by unwanted packets, hypervisor 114A/114B may implement distributed firewall (DFW) engine 118A/118B to filter packets to and from associated VMs 131-134. For example, at host-A 110A, hypervisor 114A implements DFW engine 118A to filter packets for VM1 131 and VM2 132. SDN controller 180 may be used to configure firewall rules that are enforceable by DFW engine 118A/118B. In practice, packets may be filtered according to firewall rules at any point along the datapath from a source (e.g., VM1 131) to a physical NIC (e.g., 124A). In one embodiment, a filter component (not shown) may be incorporated into each VNIC 141-144 to enforce firewall rules configured for respective VMs 131-134. The filter components may be maintained by DFW engines 118A-B. In practice, however, DFW engine 118A/118B might not be able to defend against all possible security threats.

Correlation-Based Security Threat Analysis

According to examples of the present disclosure, correlation-based security threat analysis may be performed to improve defense against malware and data center security. Throughout the present disclosure, the term "correlation" may refer generally a process of identifying a relationship or connection between two or more sets of information. The term "security threat" or "malware" may be used as an umbrella term to cover hostile or intrusive software, including but not limited to botnets, viruses, worms, Trojan horse programs, spyware, phishing, adware, riskware, rookits, spams, scareware, ransomware, or any combination thereof.

Figure 2:
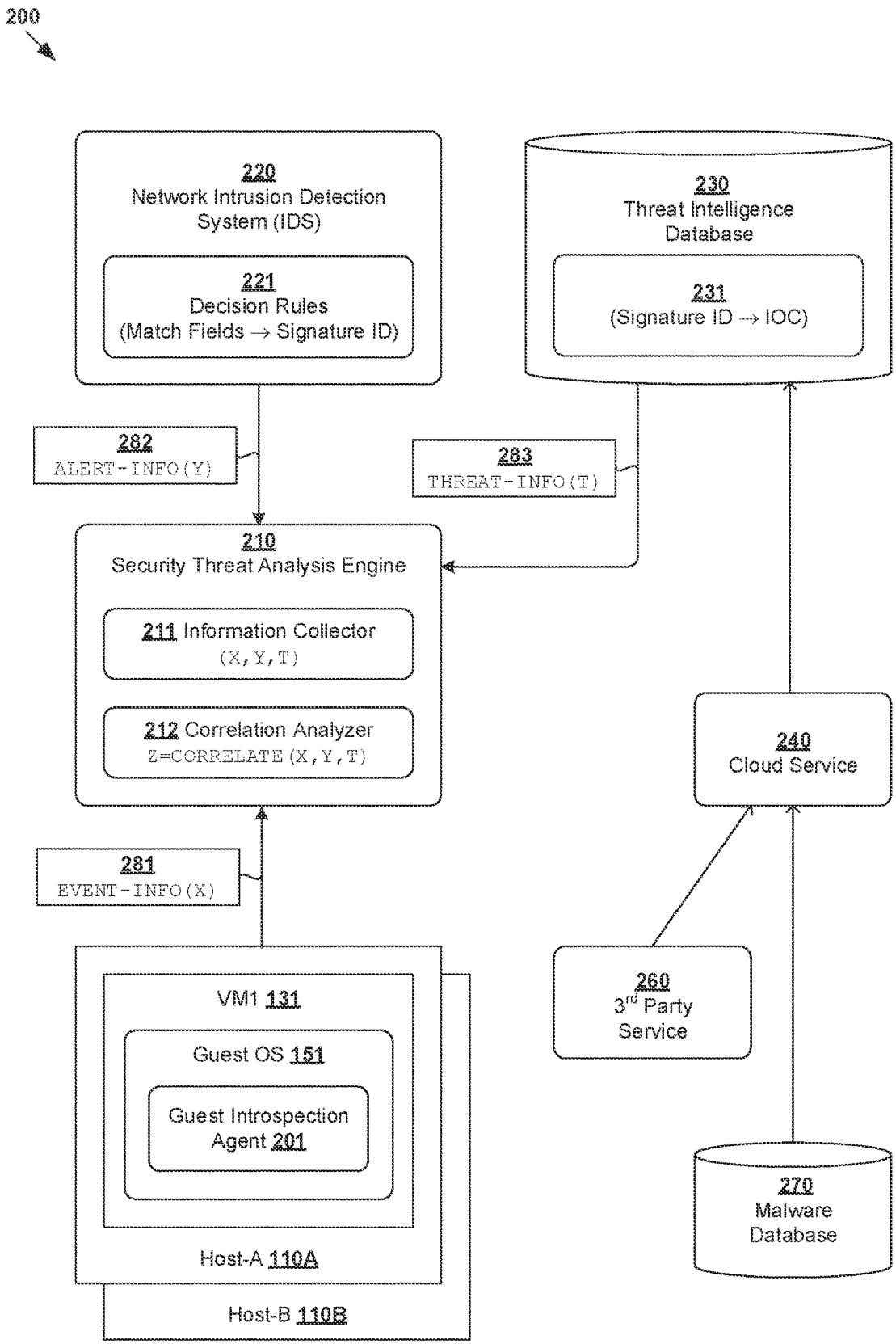
FIG. 2 is a schematic diagram illustrating an example correlation-based security threat analysis in an SDN environment.

Examples of the present disclosure may be implemented using any suitable "computer system," such as security threat analysis engine 210 in FIG. 1 and FIG. 2.

An example system is shown in FIG. 2, which is a schematic diagram illustrating example correlation-based security threat analysis 200 in SDN environment 100. In this example, security threat analysis engine 210 may be configured to perform correlation-based security threat analysis by interacting with various entities, such as hosts 110A-B supporting various VMs (only VM1 131 is shown for simplicity), network intrusion detection system (IDS) 220, threat intelligence database 230, etc. Depending on the desired implementation, security threat analysis engine 210 may be implemented using VM(s) or a physical machine (e.g., bare metal machine). Security threat analysis engine 210 may include any suitable software, hardware or firmware component(s), such as an information collector (see 211) and a correlation analyzer (212).

Figure 3:
FIG. 3 is a flowchart of an example process for a computer system to perform correlation-based security threat analysis.

In more detail, FIG. 3 is a flowchart of example process 300 for a computer system to perform correlation-based security threat analysis in SDN environment 100. Example process 300 may include one or more operations, functions, or actions illustrated by one or more blocks, such as 310 to 370. The various blocks may be combined into fewer blocks, divided into additional blocks, and/or eliminated depending on the desired implementation. In the following, various examples will be discussed using security threat analysis engine 210 as an example "computer system," VM1 131 as an example "virtualized computing instance," host-A 110A as an example "host." The term "obtaining" may refer generally to retrieving or receiving information from an entity or any suitable database. At security threat analysis engine 210, information collector 211 may be configured to perform blocks 310-320 and correlation analyzer 212 to perform blocks 330-350.

At 310 in FIG. 3, security threat analysis engine 210 may obtain event information (X) that is generated by monitoring VM1 131 supported by host-A 110A. Depending on the desired implementation, the event information (X) may be generated by a guest introspection agent (see 201 in FIG. 2) that is configured to monitor events associated with VM1 131 at a VM-level granularity. The event information (X) may include one or more of the following: (a) software information associated with application(s) running on VM1 131; (b) process information associated with process(es) running on VM1 131; (c) memory dump information; (d) registry activity information; and (e) file system information. See also 281 in FIG. 2.

At 320 in FIG. 3, security threat analysis engine 210 may obtain network alert information (Y) that is generated by monitoring network traffic associated with VM1 131. The network alert information (Y) may specify security threat signature(s) that are detected based on the network traffic. The network alert information (Y) may be generated by a network IDS (see 220 in FIG. 2) that is configured to monitor network traffic to/from various VMs (including VM1 131). A "security threat signature" or more simply "signature" may be defined using any suitable header and/or payload information of network packet(s). See also 282 in FIG. 2.

At 330 in FIG. 3, security threat analysis engine 210 may map the network alert information (Y) to threat information (T). For example, at 331-332, the mapping process may involve identifying indicator(s) of compromise associated with the security threat signature(s) specified by the network alert information (Y). As will be discussed using FIGS. 4-6, security threat analysis engine 210 may generate and send a query to a threat intelligence database (see 230 in FIG. 2) to obtain the threat information (T) based on the security threat signature(s). See also 283 in FIG. 2.

In general, network alert information (Y) may describe a potential attack, including when the attack occurs, who performed the attack and who the victim is. The threat information (T) may describe a process about how the attack is carried out, a footprint of the attack, a campaign associated with the attack. The term "indicator of compromise" may refer generally to a technical artifact that indicates the presence of a security threat or malware. For example, an indicator of compromise may be an Internet protocol (IP) address, domain name, file hash, uniform resource locator (URL) of a botnet command and control server, file name, user name, email address, user agent, process hash, process name, registry key, virus signature, path, etc.

At 340 in FIG. 3, security threat analysis engine 210 may perform a correlation analysis based on the event information (X), network alert information (Y) and threat information (T). At 350, security threat analysis engine 210 may determine whether there is a potential security threat associated with VM1 131. If a correlation is identified based on the correlation analysis (see 360), it is determined that there is a potential security threat. In this case, any suitable remediation action(s) may be performed. Otherwise (see 370), if correlation is identified based on the correlation analysis, it is determined that no potential security threat is detected and no further action is taken.

Block 340 may involve identifying a correlation or relationship between (a) a particular event specified by the event information (X) and (b) a particular indicator of compromise specified by the threat information (T). As will be exemplified using FIGS. 4-6, security threat analysis engine 210 may be able to detect that a particular advanced persistent threat (APT) is active, such as APT18, APT39, etc. Through the correlation analysis, a correlation may be identified between the APT and events reported by guest introspection agent 201 on VM1 131.

By correlating information (X, Y, T) from different levels of granularity, security threat analysis according to the examples of the present disclosure may benefit from a deeper visibility at a VM level as well as a wider visibility at a network level. Examples of the present disclosure should be contrasted against conventional approaches that rely on either network IDS 220 or guest introspection agent 201, but not both. Various examples will be explained below using FIGS. 4-6.

Detailed Examples

Figure 4:
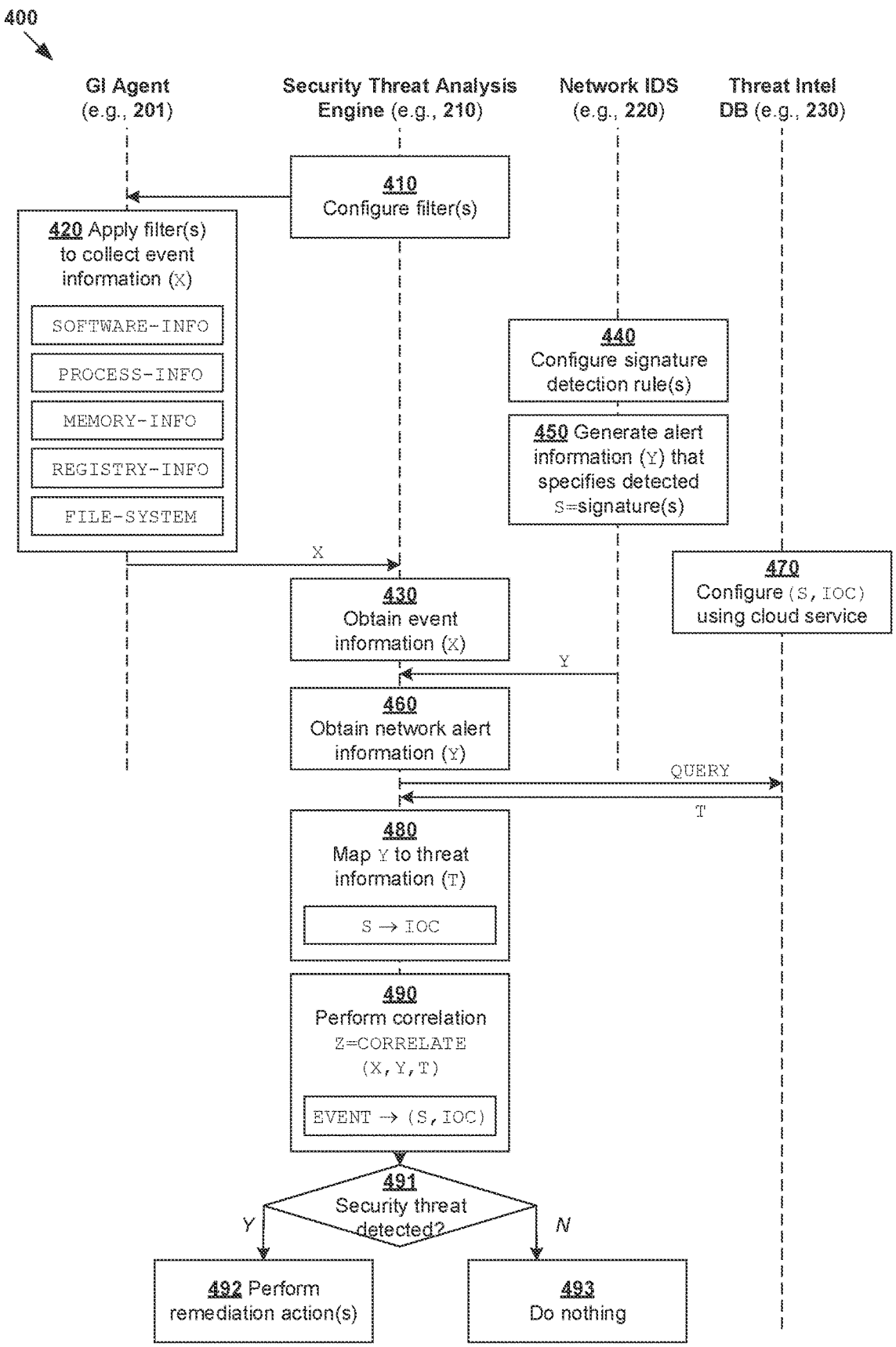
FIG. 4 is a flowchart of an example detailed process for a computer system to perform correlation-based security threat analysis.
Figure 5:
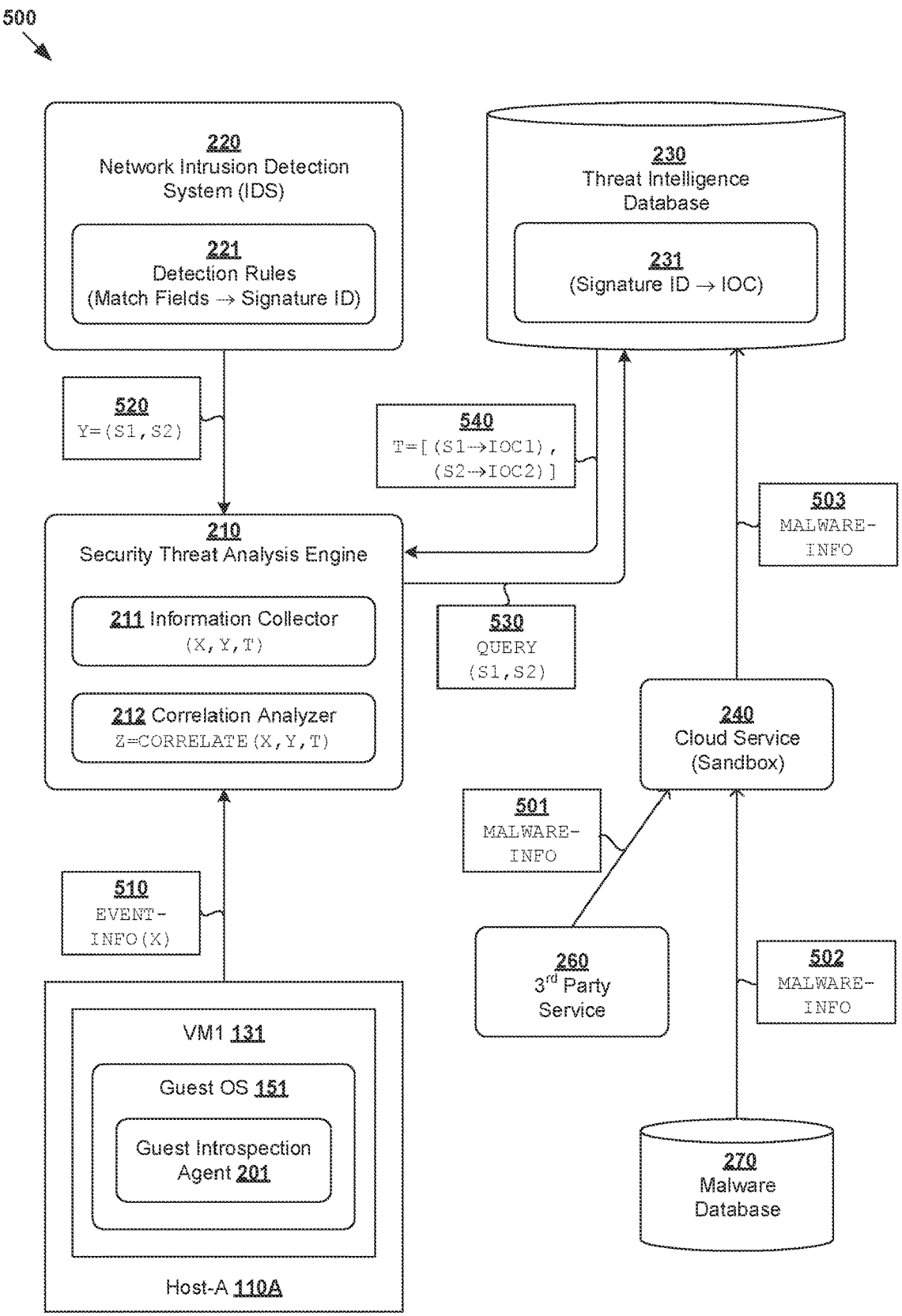
FIG. 5 is a schematic diagram illustrating an example correlation-based security threat analysis.

FIG. 4 is a flowchart of example detailed process 400 for correlation-based security threat analysis in SDN environment 100. Example process 400 may include one or more operations, functions, or actions illustrated at 410 to 493. The various operations, functions or actions may be combined into fewer blocks, divided into additional blocks, and/or eliminated depending on the desired implementation. The example in FIG. 4 will be explained using FIG. 5, which is a schematic diagram illustrating example 500 of correlation-based security threat detection. At security threat analysis engine 210, blocks 410, 430 and 460 may be performed using information collector 211, and blocks 480-493 using correlation analyzer 212.

(a) Event Information (X)

At 410 in FIG. 4, security threat analysis engine 210 may configure guest introspection agent 201 to monitor VM1 131 and generate event information (X) at a VM-level granularity. Block 410 may involve configuring filter(s) on guest introspection agent 201 to collect any suitable event information associated with the software-related behavior of VM1 131. In practice, a filter may be configured based on prevalent malware IOC, such as file path(s), registry path(s), process name(s), etc.

At 420 in FIG. 4, guest introspection agent 201 may apply filter(s) to monitor VM1 131 to generate event information (X), such as software information (denoted as "SOFTWARE-INFO"), process information (PROCESS-INFO), memory dump information (MEMORY-INFO), registry activity information (REGISTRY-INFO), file system information (FILE-SYSTEM) or any combination thereof.

In more detail, software information may include a list of installed software application(s) running on VM1 131, software version information, patch level information and installed path information to facilitate detection of exploits. Process information may include a list of process(es) running on VM1 131 to facilitate malware detection based on process parent-child relationship. Memory dump information may include a memory dump of process(es) running on VM1 131 to facilitate detection of in-memory malware that may not have any file-based footprint. Registry activity information may identify registry key update(s) on VM1 131 to facilitate detection of malware that requires the update(s) to establish persistence. File system information may facilitate detection of malware that requires file system update(s).

At 430 in FIG. 4, security threat analysis engine 210 may obtain the event information (X) generated by guest introspection agent 201. For example, security threat analysis engine 210 may retrieve the event information (X) by generating and sending a request to guest introspection agent 201. Alternatively, guest introspection agent 201 may send (i.e., push) the event information (X) to security threat analysis engine 210. The event information (X) may be retrieved or received in any suitable format, such as file path(s) or link(s). See also 510 in FIG. 5.

(b) Network Alert Information (Y)

At 440 in FIG. 4, network IDS 220 may be configured with detection rules to analyze network-level traffic through pattern matching. Depending on the desired implementation, each detection rule may specify match field(s) associated with a target signature of interest. The match field(s) may be defined using any suitable packet header information and/or payload information. If there is a match, a corresponding action may be performed, such as generate network alert information identifying a particular signature ID detected by network IDS 220. See 221 in FIG. 5.

Example packet header information inspected by network IDS 220 based on a detection rule may include: IP/MAC address information, IP protocol information, IP option field(s), packet fragmentation parameters, checksum information, TCP/UDP port number(s), packet flag(s), Internet Control Message Protocol (ICMP) packet(s), any combination thereof. The match field(s) may be configured to detect any suitable security threat signatures, such as attacks using TCP (e.g., TCP host sweep, TCP port scans, TCP session hijacking), attacks using UDP (e.g., UDP port scans, UDP applications), attacks on web server and browser (e.g., using HTTP), distributed denial of service (DDoS) attacks, domain name system (DNS) attacks, network traffic going to a suspected domain (e.g., .bazar used by malware bazarloader), etc.

For example, Windows® PowerShell is a task automation and configuration management framework using a command-line shell and associated scripting language. One detection rule may be configured to detect target signature=HTTP request from PowerShell (e.g., running on VM1 131) based on pattern matching. If there is a match, corresponding action=generate alert information (Y) identifying the signature may be generated. In practice, however, benign software may also use PowerShell and cause a false alarm. As such, security threat analysis engine 210 may perform further on alert information (Y) to determine whether there is a potential security threat.

At 450-460 in FIG. 4, in response to matching a packet under inspection to a detection rule, network IDS 220 may generate and send network alert information (Y) to security threat analysis engine 210. The network alert information (Y) may identify signature(s) detected by network IDS 220, such as Y=(S1, S2) at 520 in FIG. 5. Compared to event information (X) from guest introspection agent 201, the network alert information (Y) from network IDS 220 may provide a wider visibility at a network level.

(c) Threat Information (T)

At 470 in FIG. 4, threat intelligence database 230 may be configured using cloud service 240 based on an analysis of various vulnerabilities, malware and corresponding signatures. In practice, block 470 may involve cloud service 240 identifying trending malware information (e.g., samples) for various signatures and executing the malware samples (e.g., in a sandbox) to identify IOC information. Trending malware samples may be obtained from malware database 250 and/or third-party service 260, such as Virus Total (VT), National Institute of Standards and Technology (NIST) and Reversing Labs. See also 501-503 in FIG. 5. Based on malware sample execution, cloud service 240 may then populate threat intelligence database 230 with mapping information (e.g., database entries) that associates security threat signature(s) with indicator(s) of compromise.

At 480 in FIG. 4, security threat analysis engine 210 may map the network alert information (Y) from network IDS 220 to threat information (T) specifying indicator(s) of compromise associated with each signature ID (e.g., S1 and S2) specified by network alert information (Y). In the example in FIG. 5, the mapping process may include generating and sending a query specifying signature IDs (e.g., S1 and S2) to threat intelligence database 230 populated by cloud service. In response, threat information (T) may include indicator(s) of compromise associated with the signature IDs, such as first mapping=(S1, IOC1) and second mapping=(S2, IOC2). See corresponding 530-540 in FIG. 5.

In practice, an indicator of compromise (e.g., IOC1) associated with a security threat signature (e.g., S1) may be related to tool(s), tactic(s), technique(s) or procedure(s) utilized by a malicious third party. For example, malware generally uses a persistence mechanism to remain installed and running on a target system (e.g., VM1 131) even after the system reboots. Having persistence over the target system allows an attacker to gain access to the target system remotely and possibly infect other systems. There are various ways to achieve malware persistence, such as updating registry run key(s), modifying a startup folder to place scripts or deploy a tool, etc. Some examples will be discussed using FIG. 6 below.

Correlation Analysis

At 490 in FIG. 4, security threat analysis engine 210 may perform a correlation analysis based on event information (X), network alert information (Y) and threat information (T). At 491, security threat analysis engine 210 may determine whether there is a potential security threat associated with VM1 131 based on the correlation analysis. If detected (see 492), remediation action(s) may be performed, but otherwise (see 493), no further action is necessary. One remediation action involves generating and sending a notification message to inform SDN controller 180 of the potential security threat. SDN controller 180 and/or SDN manager 184 may then send an alert to a user (e.g., network administrator). Depending on the desired implementation, SDN controller 180 may instruct host-A 110A to isolate VM1 131. To assess whether other processes on VM1 131 are infected, additional forensic analysis may be performed.

Some examples will be discussed using FIG. 6, which is a schematic diagram illustrating example correlation analysis 600 based on event information (X), network alert information (Y) and threat information (T). Referring first to 610 in FIG. 6, event information (X) from guest introspection agent 201 may include software information (see 611), process information (see 612), memory dump information (see 613), registry activity information (see 614) and file system information (see 615). File system information 615 may specify a file event indicating that a startup folder has been modified. Registry activity information 614 further indicates that two registry run keys (i.e., RUN-KEY1 and RUN-KEY2) have been added or updated. These event(s) may be benign or caused by persistence establishment by malware.

Figure 6:
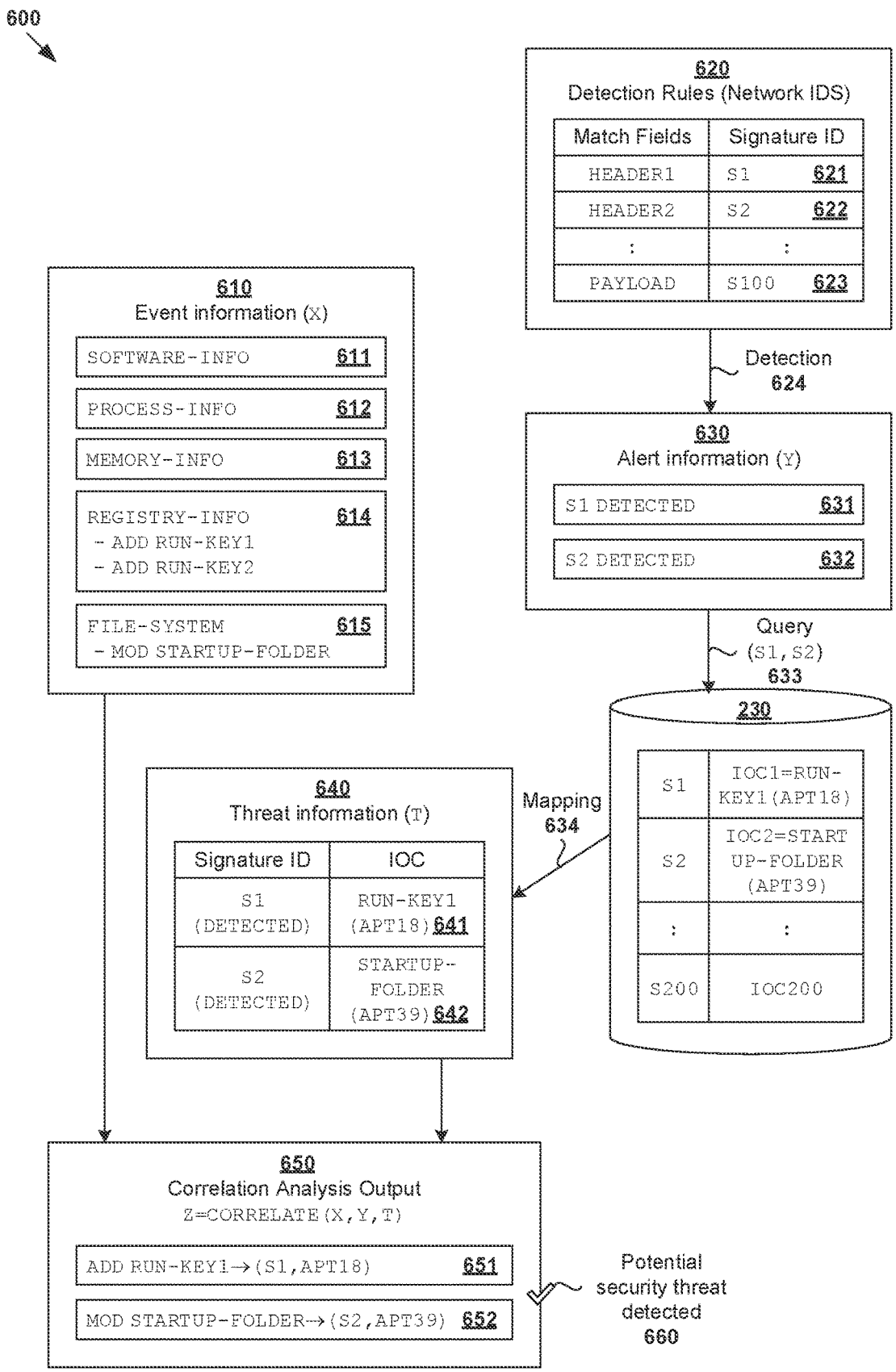
FIG. 6 is a schematic diagram illustrating example correlation analysis based on event information, network alert information and threat information.

At 620-630 in FIG. 6, network alert information (Y) may be generated by network IDS 220 based on a set of detection rules. Each detection rule may specify match field(s) for a particular signature, such as a first set of header information (HEADER1) for S1, a second set of header information (HEADER2) for S2, payload information (PAYLOAD) for S100, etc. Here, two signatures are detected, such as S1 and S2. See 621-623 (rules), 624 (detection) and 631-632 (signatures) in FIG. 6.

At 640 in FIG. 6, network alert information (Y) may be mapped to threat information (T) based on a query identifying (S1, S2). According to threat intelligence database 230, signature=S1 may be mapped to indicator of compromise=IOC1 associated with APT18, where it is known to establish persistence using a particular registry run key (e.g., RUN-KEY1). In another example, S2 may be mapped to IOC2 associated with APT39, where it is known to maintain persistence by modifying a startup folder. See also 633-634 (mapping) and 641-642 in FIG. 6.

At 650-660 in FIG. 6, a correlation analysis may be performed to detect potential security threats based on (X, Y, T). In a first example (see 651), a first correlation may be established between (a) a first event associated with adding RUN-KEY1 and (b) a first indicator of compromise associated with signature=S1. This indicates the first event is potentially part of a malware campaign associated with APT18. Note that the event associated with RUN-KEY2 is not matched with any signature and associated indicator of compromise, and therefore not considered to be a potential security threat based on the correlation analysis. Additional analysis may be performed (e.g., at block 380 in FIG. 3 and block 493 in FIG. 4) to investigate whether it is a potential security threat according to other detection approach(es).

In a second example (see 652), a second correlation may be established between (a) a second event associated with modifying a startup folder and (b) a second indicator of compromise associated with signature=S2. This indicates the second event is potentially part of a malware campaign associated with APT39. In both examples, a notification message may be sent to a network administrator such that further investigation may be performed. Using the correlation analysis, security threat detection may be performed more comprehensively to improve data center security. Further, since threat information 640 may include the current threat landscape information, examples of the present may help identify active threat actors and attacks that are occurring in the cyber world.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-134. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, the instructions or program code, when executed by the processor of the computer system, may cause the processor to implement examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

We claim:

1. A method for a computer system to perform correlation-based security threat analysis, wherein the method comprises:
    obtaining event information that is generated by monitoring a virtualized computing instance supported by a host;
    obtaining network alert information that is generated by monitoring network traffic associated with the virtualized computing instance, wherein the network alert information specifies one or more security threat signatures that are detected based on the network traffic;
    mapping the network alert information to threat information that specifies one or more indicators of compromise associated with the one or more security threat signatures specified by the network alert information;
    performing a correlation analysis based on the event information, the network alert information and the threat information, wherein performing the correlation analysis comprises: identifying a correlation between (a) a particular event specified by the event information and (b) a particular indicator of compromise specified by the threat information and associated with a particular security threat signature; and
    determining whether there is a potential security threat associated with the virtualized computing instance based on the correlation analysis.

2. The method of claim 1, wherein performing the correlation analysis further comprises:
    identifying the correlation between (a) the particular event and (b) the particular indicator of compromise associated with a persistence mechanism by malware running on the virtualized computing instance.

3. The method of claim 1, wherein determining whether there is a potential security threat comprises:
    in response to identifying the correlation between (a) the particular event and (b) the particular indicator of compromise, determining that there is a potential security threat, otherwise determining that no potential security threat is detected.

4. The method of claim 1, wherein mapping the network alert information to the threat information comprises:
    generating and sending a query to a threat intelligence database to obtain the threat information, wherein the query identifies the one or more security threat signatures specified by the network alert information.

5. The method of claim 1, wherein obtaining the event information comprises:
    obtaining, from a guest introspection agent on the virtualized computing instance, the event information that includes one or more of the following: (a) software information associated with at least one application running on the virtualized computing instance; (b) process information associated with at least one process running on the virtualized computing instance; (c) memory dump information; (d) registry activity information and (e) file system information.

6. The method of claim 1, wherein obtaining the network alert information comprises:
    obtaining, from a network intrusion detection system (IDS), the network alert information that is generated by the network IDS in response to detecting the one or more security threat signatures through inspection of the network traffic.

7. A non-transitory computer-readable storage medium that includes a set of instructions which, in response to execution by a processor of a computer system, cause the processor to perform correlation-based security threat analysis, wherein the method comprises:
    obtaining event information that is generated by monitoring a virtualized computing instance supported by a host;
    obtaining network alert information that is generated by monitoring network traffic associated with the virtualized computing instance, wherein the network alert information specifies one or more security threat signatures that are detected based on the network traffic;
    mapping the network alert information to threat information that specifies one or more indicators of compromise associated with the one or more security threat signatures specified by the network alert information;
    performing a correlation analysis based on the event information, the network alert information and the threat information, wherein performing the correlation analysis comprises: identifying a correlation between (a) a particular event specified by the event information and (b) a particular indicator of compromise specified by the threat information and associated with a particular security threat signature; and
    determining whether there is a potential security threat associated with the virtualized computing instance based on the correlation analysis.

8. The non-transitory computer-readable storage medium of claim 7, wherein performing the correlation analysis further comprises:
    identifying the correlation between (a) the particular event and (b) the particular indicator of compromise associated with a persistence mechanism by malware running on the virtualized computing instance.

9. The non-transitory computer-readable storage medium of claim 7, wherein determining whether there is a potential security threat comprises:
    in response to identifying the correlation between (a) the particular event and (b) the particular indicator of compromise, determining that there is a potential security threat, otherwise determining that no potential security threat is detected.

10. The non-transitory computer-readable storage medium of claim 7, wherein mapping the network alert information to the threat information comprises:
generating and sending a query to a threat intelligence database to obtain the threat information, wherein the query identifies the one or more security threat signatures specified by the network alert information.

11. The non-transitory computer-readable storage medium of claim 7, wherein obtaining the event information comprises:
obtaining, from a guest introspection agent on the virtualized computing instance, the event information that includes one or more of the following: (a) software information associated with at least one application running on the virtualized computing instance; (b) process information associated with at least one process running on the virtualized computing instance; (c) memory dump information; (d) registry activity information and (e) file system information.

12. The non-transitory computer-readable storage medium of claim 7, wherein obtaining the network alert information comprises:
obtaining, from a network intrusion detection system (IDS), the network alert information that is generated by the network IDS in response to detecting the one or more security threat signatures through inspection of the network traffic.

13. A computer system, comprising:
a processor; and
a non-transitory computer-readable storage medium having stored thereon instructions that, when executed by the processor, cause the processor to:
obtain event information that is generated by monitoring a virtualized computing instance supported by a host; and
obtain network alert information that is generated by monitoring network traffic associated with the virtualized computing instance, wherein the network alert information specifies one or more security threat signatures that are detected based on the network traffic;
map the network alert information to threat information that specifies one or more indicators of compromise associated with the one or more security threat signatures specified by the network alert information;
perform a correlation analysis based on the event information, the network alert information and the threat information; and
determine whether there is a potential security threat associated with the virtualized computing instance based on the correlation analysis,
wherein the instructions for performing the correlation analysis cause the processor to identify a correlation between (a) a particular event specified by the event information and (b) a particular indicator of compromise specified by the threat information and associated with a particular security threat signature.

14. The computer system of claim 13, wherein the instructions for performing the correlation analysis further cause the processor to:
identify the correlation between (a) the particular event and (b) the particular indicator of compromise associated with a persistence mechanism by malware running on the virtualized computing instance.

15. The computer system of claim 13, wherein the instructions for determining whether there is the potential security threat cause the processor to:
in response to identifying the correlation between (a) the particular event and (b) the particular indicator of compromise, determine that there is a potential security threat, otherwise determining that no potential security threat is detected.

16. The computer system of claim 13, wherein the instructions for mapping the network alert information to the threat information cause the processor to:
generate and send a query to a threat intelligence database to obtain the threat information, wherein the query identifies the one or more security threat signatures specified by the network alert information.

17. The computer system of claim 13, wherein the instructions for obtaining the event information cause the processor to:
obtain, from a guest introspection agent on the virtualized computing instance, the event information that includes one or more of the following: (a) software information associated with at least one application running on the virtualized computing instance; (b) process information associated with at least one process running on the virtualized computing instance; (c) memory dump information; (d) registry activity information and (e) file system information.

18. The computer system of claim 13, wherein the instructions for obtaining the network alert information cause the processor to:
obtain, from a network intrusion detection system (IDS), the network alert information that is generated by the network IDS in response to detecting the one or more security threat signatures through inspection of the network traffic.

* * * * *